United States Patent
Mann (10) Patent No.: US 7,254,647 B2
(45) Date of Patent: Aug. 7, 2007

(54) NETWORK FOR DECREASING TRANSMIT LINK LAYER CORE SPEED

(75) Inventor: Gregory J. Mann, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 09/816,967

(22) Filed: Mar. 23, 2001

(65) Prior Publication Data

US 2004/0210687 A1    Oct. 21, 2004

(51) Int. Cl.
 G06F 15/173  (2006.01)
 G06F 5/00    (2006.01)
 G06F 13/12   (2006.01)

(52) U.S. Cl. .............. 709/250; 709/233; 709/234; 710/51; 710/52; 710/60; 710/71; 710/72

(58) Field of Classification Search ........... 709/213, 709/214, 225, 229, 232, 233, 234, 235, 250; 710/51–52, 60, 71–72
See application file for complete search history.

(56) References Cited

U.S. PATENT DOCUMENTS

| | | | |
|---|---|---|---|
| 4,701,913 | A | 10/1987 | Nelson |
| 5,175,819 | A | 12/1992 | Le Ngoc et al. |
| 5,212,686 | A | 5/1993 | Joy et al. |
| 5,425,022 | A * | 6/1995 | Clark et al. ............ 370/360 |
| 5,488,408 | A * | 1/1996 | Maduzia et al. ........... 725/14 |
| 5,715,248 | A | 2/1998 | Lagle, III et al. |
| 5,768,546 | A | 6/1998 | Kwon |
| 5,938,731 | A * | 8/1999 | Schreiter ................ 709/227 |
| 6,154,797 | A | 11/2000 | Burns et al. |
| 6,199,137 | B1 * | 3/2001 | Aguilar et al. ........... 710/305 |
| 6,389,120 | B1 * | 5/2002 | Garland et al. ......... 379/93.01 |
| 6,490,250 | B1 * | 12/2002 | Hinchley et al. ......... 370/232 |
| 6,854,031 | B1 * | 2/2005 | Ouellet et al. ........... 710/305 |
| 6,956,852 | B1 * | 10/2005 | Bechtolsheim et al. ..... 370/389 |

(Continued)

FOREIGN PATENT DOCUMENTS

EP    0 290 172    11/1988

(Continued)

OTHER PUBLICATIONS

IBM Technical Disclosure Bulletin, "Data Funnel for Connection of Multiple Channel Types", vol. 32, No. 2, Jul. 1989, pp. 54-55.

(Continued)

Primary Examiner—Nathan J. Flynn
Assistant Examiner—Joshua Joo
(74) Attorney, Agent, or Firm—Gibb & Rahman, LLC; Michael LeStrange, Esq.

(57) ABSTRACT

A processor includes a core for providing speed reduction in communications between a transmission media and a processor having an upper link layer in a parallel-serial architecture. The core includes a lower logic layer, serial lanes connecting the logic layer to the transmission media, at least one selector connected to the serial lanes for supporting at least two differing data widths. The logic layer controls the selector, and multiple buffers are interposed in the serial lanes. The selector enables the speed reductions is the upper link layer of the processor. The processor is particularly applicable to interface components used in InfiniBand-type hardware.

15 Claims, 7 Drawing Sheets

U.S. PATENT DOCUMENTS 7,054,331 B1 * 5/2006 Susnow et al. ............. 370/465
2004/0213241 A1 * 10/2004 Kukic ..................... 370/395.1

FOREIGN PATENT DOCUMENTS

| EP | 0 982 898 A1 | 3/2000 |
| GB | 2 094 523 | 9/1982 |
| JP | 57-157348 | 9/1982 |
| JP | 63-286033 | 11/1988 |
| JP | 4-61528 | 2/1992 |
| WO | WO 99/60495 | 11/1999 |

OTHER PUBLICATIONS

Olsen, "Variable-Width FIFO Buffer Sequence Large Data Words", Electronic Design, No. 14, Jun. 1987, pp. 117-120.

International Search Report, PCT/GB02/01366, Jun. 5, 2003, pp. 1-4.

* cited by examiner

NETWORK FOR DECREASING TRANSMIT LINK LAYER CORE SPEED

BACKGROUND OF THE INVENTION

1. Field of the Invention

The present invention generally relates to input/output (I/O) data transmission devices, and more particularly to first-in-first-out (FIFO) buffer devices in I/O data transmission paths.

2. Description of the Related Art

Figure 1A:
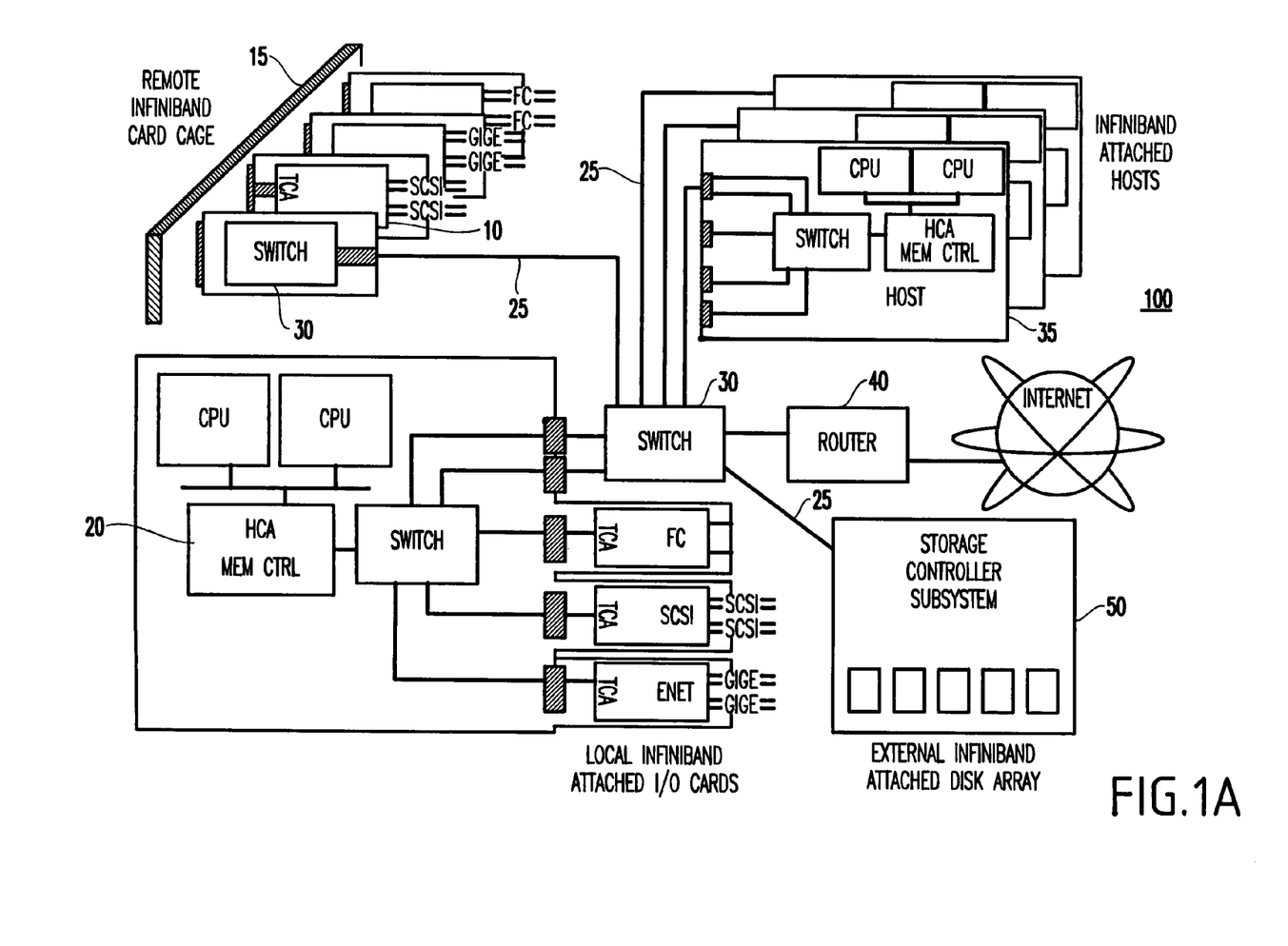
FIG. 1a is a schematic diagram of an exemplary InfiniBand network for data transmission in which the invention is preferably used.

InfiniBand (registered Trademark of the InfiniBand Trade Association, Portland, Oreg.) architecture is a new common I/O specification to deliver a channel based, switched-fabric technology that the entire hardware and software industry can adopt. A network and components associated with an InfiniBand network 100 are shown in FIG. 1a. InfiniBand based networks are designed to satisfy bandwidth-hungry network applications, such as those combining voice, data, and video on the Internet. InfiniBand architecture is being developed by the InfiniBand Trade Association that includes many hardware and software companies. Its robust layered design enables multiple computer systems and peripherals to work together more easily as a single high-performance and highly available server.

Being a fabric-centric, message-based architecture, Infini-Band is ideally suited for clustering, input/output extension, and native attachment in diverse network applications. InfiniBand technology can be used to build remote card cages 15 or connect to attached hosts 35, routers 40, or disk arrays 50. InfiniBand also features enhanced fault isolation, redundancy support, and built-in failover capabilities to provide high network reliability and availability. Featuring high-performance and reliability, these devices provide solutions for a range of network infrastructure components, including servers and storage area networks.

Figure 1B:
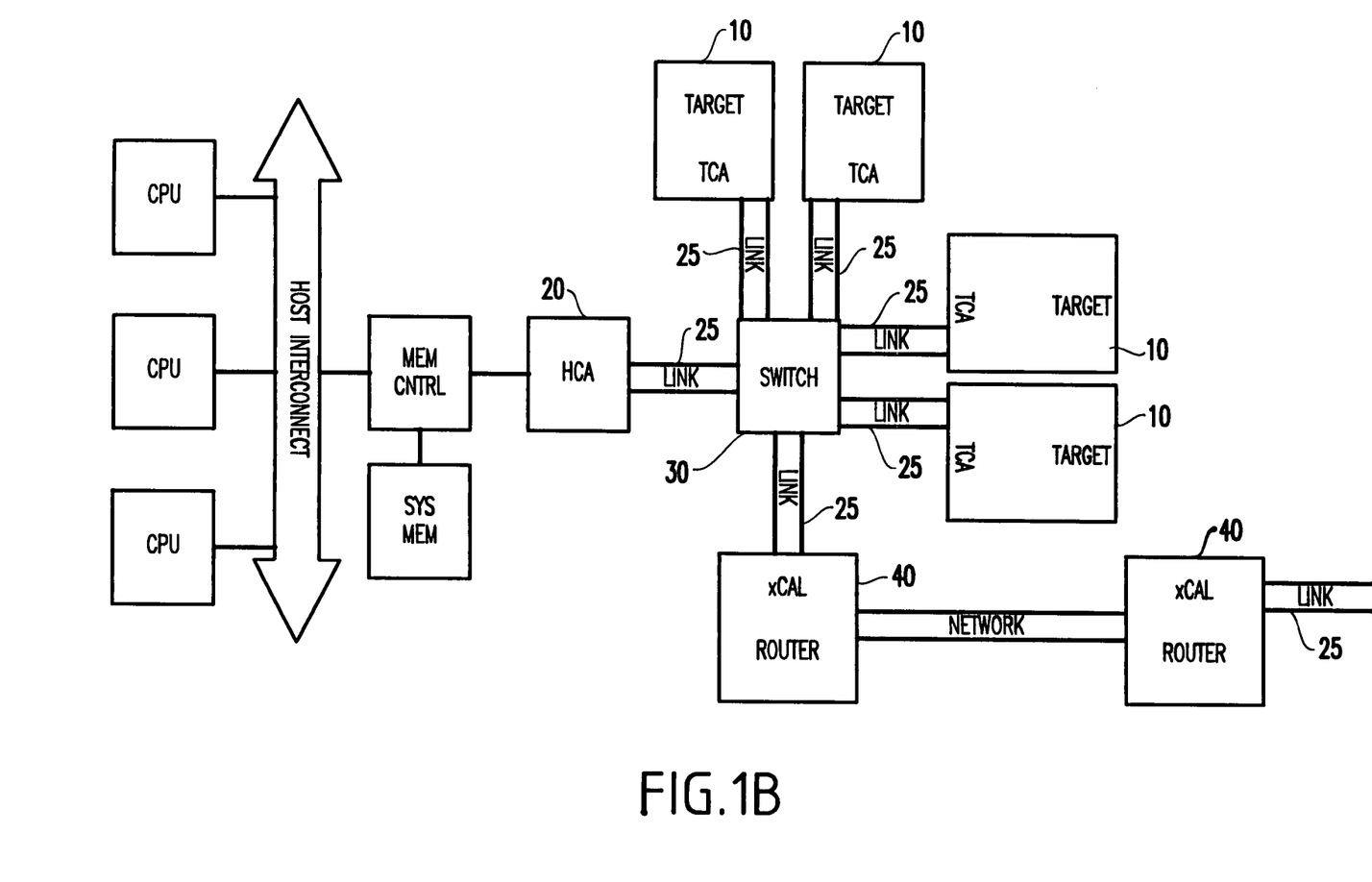
FIG. 1b is a section of the InfiniBand network with interface components.

In FIG. 1b, a block diagram is shown in exemplary form of InfiniBand components in a portion of the network shown in FIG. 1a. These components have input/output interfaces, each forming part of a target channel adapter (TCA) 10, host channel adapter (HCA) 20, an interconnect switch device 30, and routers 40, each that have application specific integrated circuits (ASIC) core interfaces that include Infini-Band Technology Link Protocol Engine (IBT-LPE) cores that connect ASICs between each of these components through links 25 in an InfiniBand Technology (IBT) network 100. The IBT-LPE core supports a range of functionality that is required by all IBT devices in the upper levels of the physical layer and the lower link layer. It also handles the complete range of IBT bandwidth requirements, up to and including a 4-wide link operating at 2.5 gigabits per second. The IBT-LPE core (large integrated circuit design) in the upper levels of the physical layer and the link layer core of the ASIC comply with standards established by the Infini-Band Trade Association in the IBTA 1.0 specifications (2001). Such architectures decouple the I/O subsystem from memory by using channel based point to point connections rather than shared bus, load and store configurations.

The TCA 10 provides an interface for InfiniBand-type data storage and communication components. Creating InfiniBand adapters that leverage the performance benefits of the InfiniBand architecture is accomplished through a cooperative, coprocessing approach to the design of an InfiniBand and native I/O adapter. The TCA 10 provides a high-performance interface to the InfiniBand fabric, and the host channel communicates with a host based I/O controller using a far less complex interface consisting of queues, shared memory blocks, and doorbells. Together, the TCA and the I/O controller function as an InfiniBand I/O channel deep adapter. The TCA implements the entire mechanism required to move data between queues and to share memory on the host bus and packets on the InfiniBand network in hardware. The combination of hardware-based data movement with optimized queuing and interconnect switch priority arbitration schemes working in parallel with the host based I/O controller functions maximizes the InfiniBand adapter's performance.

The HCA 20 enables connections from a host bus to a dual 1× or 4×InfiniBand network. This allows an existing server to be connected to an InfiniBand network and communicate with other nodes on the InfiniBand fabric. The host bus to InfiniBand HCA integrates a dual InfiniBand interface adapter (physical, link and transport levels), host bus interface, direct memory target access (DMA) engine, and management support. It implements a layered memory structure in which connection-related information is stored in either channel on-device or off-device memory attached directly to the HCA. It features adapter pipeline header and data processing in both directions. Two embedded InfiniBand microprocessors and separate direct memory access (DMA) engines permit concurrent receive and transmit data-path processing.

The interconnect switch 30 can be an 8-port 4×switch that incorporates eight InfiniBand ports and a management interface. Each port can connect to another switch, the TCA 10, or the HCA 20, enabling configuration of multiple servers and peripherals that work together in a high-performance InfiniBand based network. The interconnect switch 30 integrates the physical and link layer for each port and performs filtering, mapping, queuing, and arbitration functions. It includes multicast support, as well as performance and error counters. The management interface connects to a management processor that performs configuration and control functions. The interconnect switch 30 typically can provide a maximum aggregate channel throughput of 64 gigabits, integrates buffer memory, and supports up to four data virtual lanes (VL) and one management VL per port.

Figure 2A:
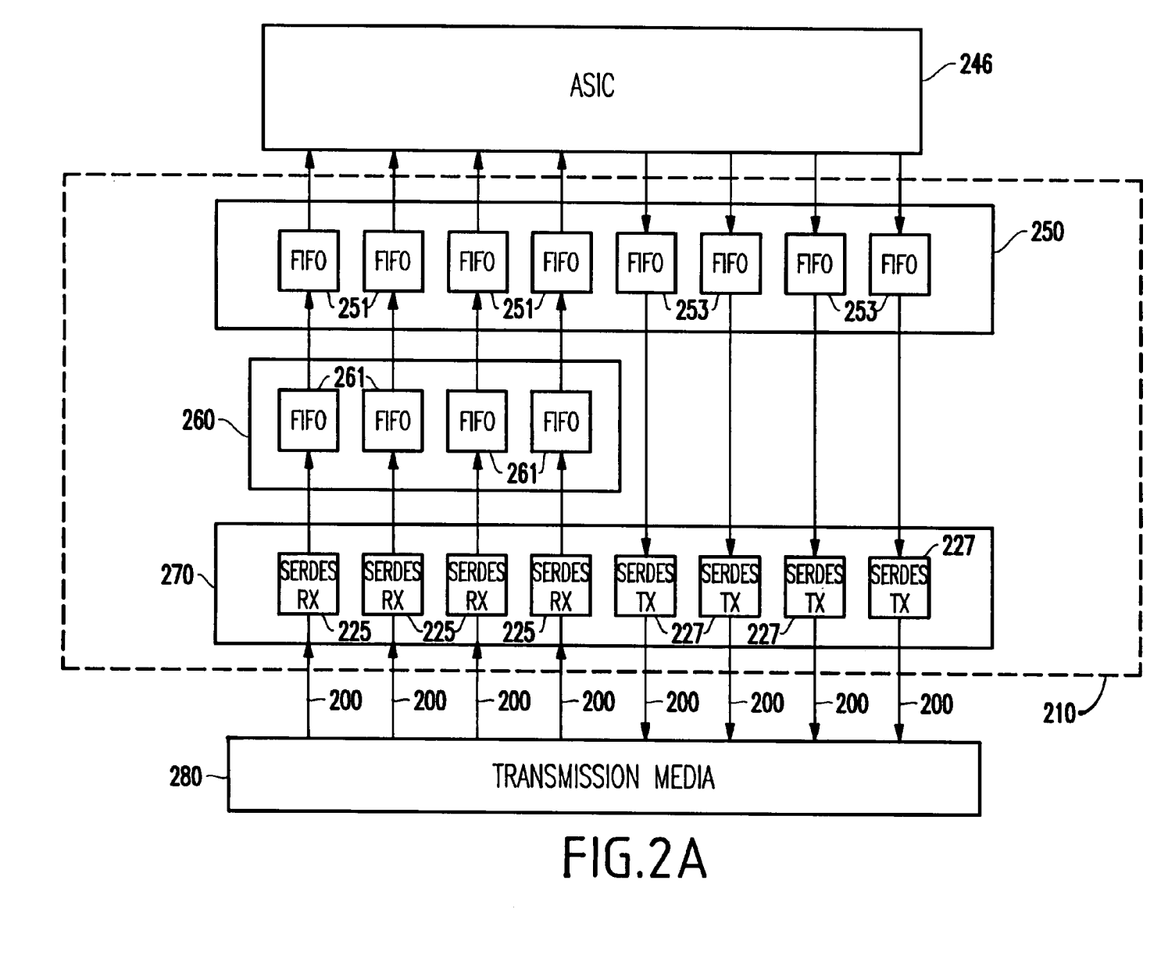
FIG. 2a is a schematic diagram of a core that provides transmission between an ASIC and a transmission media.

FIG. 2a illustrates the core logic 210 that connects an InfiniBand transmission media 280 (the links 25 shown in FIG. 1b) to an application specific integrated circuit (ASIC) 246 (such as the TCA 10, the HCA 20, the switch 30, the router 40, etc. as shown in FIG. 1b). The core logic 210 illustrated in FIG. 2a is improved using the invention described below. However, the core logic 210 shown in FIG. 2a is not prior art and may not be generally known to those ordinarily skilled in the art at the time of filing of this invention. The receive and transmit data transmission media clock 280 may operate at a different frequency (e.g., 250 MHz +/−100 parts per million on the receive path and the core logic 210 transmit data path operates at 250 MHz), which in turn may operate at a different frequency compared to the ASIC 246 clock speed (e.g., 62.5 MHz).

To accommodate the different speeds of the data signals being handled, the core logic 210 includes a serialization portion 270 that includes serialization/deserialization (SER-DES) units 225. The structure and operation of such serialization/deserialization units is well known to those ordinarily skilled in the art and such will not be discussed in detail herein so as not to unnecessarily obscure the salient features of the invention.

The InfiniBand transmission media 280 is made up of a large number of byte-striped serial transmission lanes 200 that form the links 25. The receive serialization/deserialization units 225 deserialize the signals from the transmission media 280 and perform sufficient conversion to reduce the frequency to one that is acceptable to the core logic 210. For example, if the serialization/deserialization receive units 225 operate to deserialize 10 bits at a time, a 10-to-1 reduction occurs that reduces the 2.5 gigabit per second speed on the transmission media 280 into a 250 MHz frequency that is acceptable to the core logic 210.

The core logic 210 also includes a frequency correction unit 260. The frequency of the signal propagating along the transmission media 280 may not always occur at this wire speed, but instead may be slightly above or below the desired frequency (e.g., by up to 100 parts per million). This inconsistency in the frequency is transferred through the serialization/deserialization units 225. The frequency correction unit 260 includes FIFO buffers 261 that buffer the signal being output by the serialization/deserialization units (SERDES) 225 so as to provide the signal in a uniform 250 MHz frequency to the upper layer logic 250.

The upper link layer logic 250 includes additional FIFO buffers 251 that convert the frequency of the signal output from the frequency correction unit 260 into a frequency that is acceptable to the ASIC 246. During transmission of a signal from the ASIC 246 to the transmission media 280, the process is reversed and the upper link layer logic 250 use FIFO buffers 253. Similarly, the serialization unit 270 uses other transmission serialization/deserialization units 227. Note that no correction is required by the frequency correction unit 262 for signals that are being transmitted to the transmission media 280 because the ASIC 246 generally produces a signal that does not need to be corrected.

One disadvantage of the core logic 210 shown in FIG. 2a is the large number of buffers 251, 253, 261 that are required by the upper link layer logic 250 and the frequency correction unit 260. These buffers use substantial circuit power and reduce operational speed of data being processed through the core logic 210. Therefore, there is a need to reduce the number of buffers within the core logic 210 to reduce this power usage and increase processing speed.

SUMMARY OF THE INVENTION

In view of the foregoing problems, the present invention has been devised. It is an object of the present invention to provide a parallel-serial architecture network that includes a transmission media and at least one processor connected to the transmission media by a core. The core provides communications between the transmission media and the processor.

The core includes a lower logic layer connected to the processor, serial lanes connecting the lower logic layer to the transmission media, receive and transmit buffers within the serial lanes, and selectors for control of data through the buffers. The receive and transmit buffers correct for fluctuations in the transmission media and alter the frequency of signals being processed along the serial lanes.

The invention may also include serializer/deserializers within the serial lanes. The receive buffers and the transmit buffers are preferably elastic first-in, first-out (FIFO) buffers and the receive buffers and the transmit buffers are both external to the logic layer. The transmit buffers alter a frequency of signals being transferred from the upper layer logic to the transmission media while the receive buffers process signals being transferred from the transmission media to the logic layer. The "processor" can be a host channel adapter, a target channel adapter, or an interconnect switch of the network.

In one embodiment, the invention provides communications between a transmission media and a processor in a parallel-serial architecture. The transmission media operates at a different data speed than the processor. The core includes serial lanes connecting the processor to the transmission media and selectors connected to the serial lanes. The selectors (multiplexors) selectively engage the serial lanes to alter the speed of data passing through the core.

The invention preferably includes a data controller for controlling an operation of the selector. The serial lanes have buffers for performing additional speed alteration of the data. Additional speed adjustments are attained by the selector engaging additional lanes.

The invention includes multiplexors that selectively expand the data lane widths to reduce the clock speed of the data being transferred over the data lanes. By making such a speed adjustment, the invention allows easy communication between a transmission media and a device operating at a different speed.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 4b shows a detailed view of FIG. 4a.

DETAILED DESCRIPTION OF PREFERRED EMBODIMENTS OF THE INVENTION

Figure 2B:
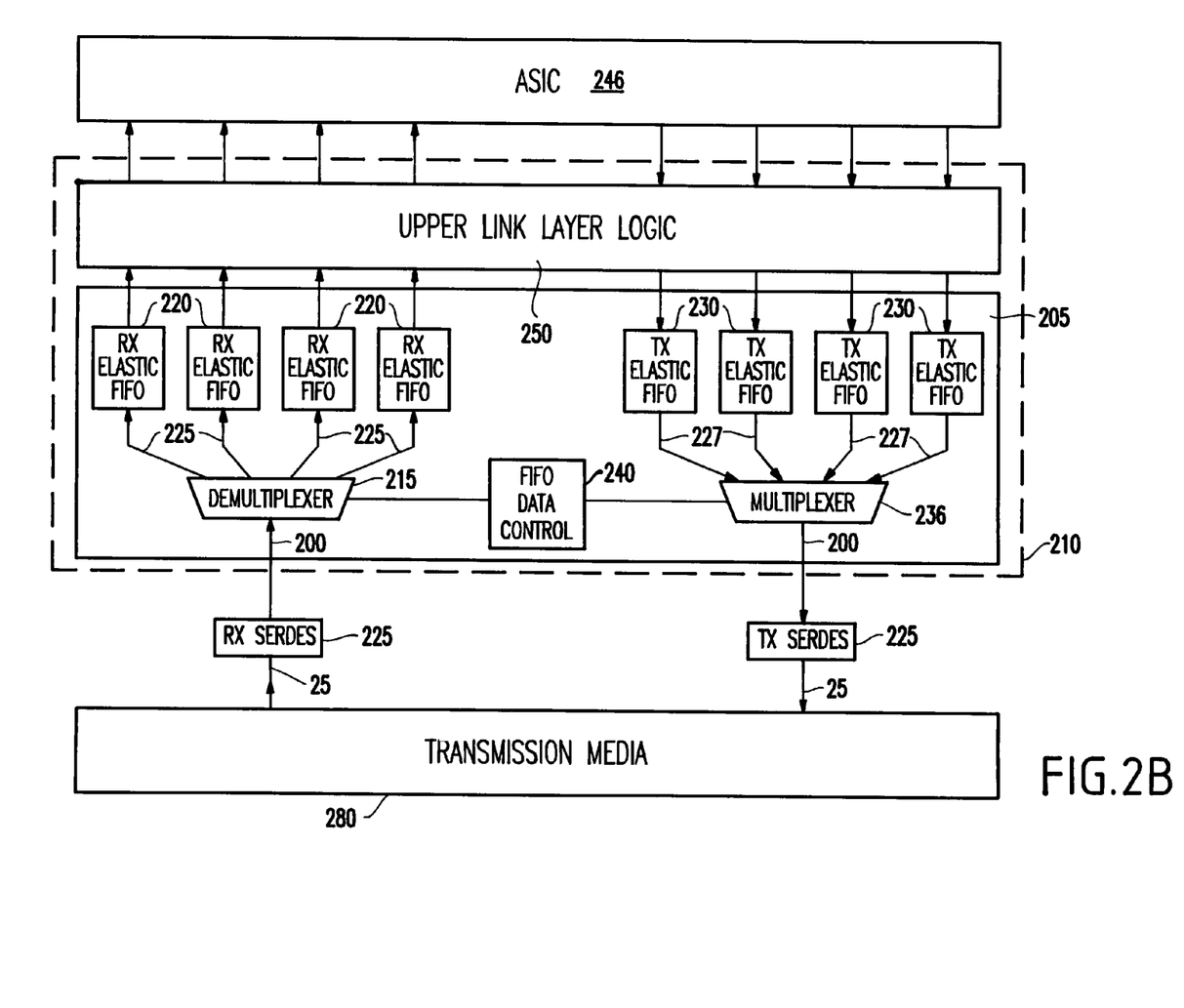
FIG. 2b is a schematic diagram of a core that provides transmission between an ASIC and a transmission media.

As mentioned above, the InfiniBand technologies create a situation where the transmission media is operating at a different speed than some of the devices connected thereto. As shown in FIG. 2b, in order to accommodate this situation, the invention includes multiplexors 215, 236, connected to elastic FIFOs 220, 230. The multiplexors 215, 236 selectively engage a different number of data lanes 225 (e.g., alter the lane width) in order to perform a speed reduction between the transmission media 280 and the ASIC 246. As shown in FIG. 2b, the invention can perform a 4×speed reduction by simultaneously transmitting the data along four lanes. However, the invention is not limited to a 4×speed reduction. To the contrary, the invention is applicable to any form of speed reduction that is enabled by selectively engaging different numbers of data lanes.

More specifically, elastic buffers 220, 230 reside between the upper link layer logic 250 and the selectors 215, 236 (the receive demultiplexor 215 and the transmit multiplexor 236). The buffers 220, 230 and multiplexors 215, 236 form a low level logic interface 205 frequency correction portion 260 (shown in FIG. 2a) has been eliminated from the structure shown in FIG. 2b for the receive data path by combining the operations of the FIFOs 261 and the FIFOs 251 into the elastic FIFOs 220.

To illustrate the utility of the invention, given that 12 data lanes are used in a network, when in a 4×reduction mode of operation, physical data lanes 4-11 can be used as wider extensions of lanes 0-3. Further, when in a 1×mode of operation using these 12 data lanes, FIFOs for data lanes 1-11 can be a wider extension of the FIFO used for data lane 0, thereby achieving up to a 12×speed reduction. Thus, when data is accessed at the transmission media 280 at the InfiniBand data rate, by using the multiplexors 215, 236, the upper link layer 250 can access wider data at a slower rate.

As mentioned above, the invention also produces an advantage in that receive elastic FIFO buffers 220 perform the function of the frequency correction portion 260 and correct any frequency deviations which may occur along the transmission media 280. FIFO buffers 220, 230 also modify the frequency of the signal to that desired by the ASIC 246. Therefore, the FIFO buffers 220 perform the functions that were previously performed by FIFO buffers 251 and 261 shown in FIG. 2a, thereby reducing the number of buffers within the core logic 210. This decrease in the number of buffers within the core logic 210 reduces power consumption, increases processing speed and decreases the chip area consumed by the core logic 210.

Integration of frequency correction and frequency adjustment processes into the input receive elastic FIFOs 220 also enables the upper layer logic 250 to have clock frequencies that are less than external components connected thereto. For example, the upper layer logic section 250 could have a speed less than 250 MHz while the buffers 220, 230 and serialization 270 portion could operate at approximately 250 MHz (the network shown in FIG. 2b moves the clock domain conversion to a lower logic level compared to that shown in FIG. 2a).

As mentioned above, some hardware in InfiniBand networks have components that operate at different speeds due to different standards imposed. For example, some devices in an InfiniBand network (that operate at 250 MHz) must communicate with non-InfiniBand interface components, such as a component that operates at 62.5 MHz (e.g., PCI-X industry standard, which operates at 133 MHz). These various speed differentials are reconciled the invention. By utilizing the speed reduction capabilities associated with selective lane width (using selectors 215, 236) and integrating the clock-compensation FIFOs 220, the invention improves network performance by lowering the latency of data transmission through the processor.

In FIG. 2b, to enable different clock speeds between the transmit media 280 (through the parallel-serial high speed physical layer) and the upper layer logic 250, data is selectively transmitted through byte striped serial transmit lanes 200, each through serializer/deserializer (TX SERDES) convertors 225. The RX and TX SERDES 225 accesses data from the elastic FIFOs 220, 230 at 250 MHz (first access lane 0, second lane 1, etc., since an InfiniBand network transmits data at 2.5 gigahertz).

The upper link layer logic 250 can access the RX and TX FIFOs at a speed down to 62.5 MHz. The speed conversion is accomplished through the lower level logic section 205 that encompasses the selectors 215, 236; the receive and transmit FIFOs 220, 230; and the FIFO data controller 240 that controls lane width using the selectors 215, 236.

The selectors 215, 236 provide the logic to implement lane width changes through the FIFOs 220, 230 respectively in conjunction with the FIFO data controller 240, as discussed in greater detail below in FIGS. 3a and 3b. Thus, the inputs and outputs to the entire block of logic accomplishes the requisite speed reduction.

Logic controller circuitry for pacing the upper transmit layer logic 250 is incorporated therein to prevent FIFO overflow. The logic controller detects when the elastic FIFO buffers 220, 230 are almost full, and then interrupts the clocking of the upper layer logic 250 (pauses data flow) to prevent excessive data flow into these elastic FIFOs 220, 230.

Elastic FIFO buffers 220, 230, each have multiple memory locations into which data is consecutively input. The elastic FIFOs are the preferred form of FIFO used in the invention because they can tolerate different amounts of data (e.g., are expandable). Alternatively, regular FIFOs (e.g., non-elastic) can be used, but with restriction since only a fixed amount of data can be contained within them at any instant in time. Data is output from FIFO's in the same consecutive order in which it is input.

Since these FIFOs 220, 230 are elastic, there are controls on the input that instruct the FIFO buffers to latch the current input and place it into the next memory location, and controls on the output that instruct the FIFO buffers to present the next memory location on the output. There are also indications from the device 220, 230 on how much data is currently in the device. The frequency at which data is removed from the device is not necessarily related to the frequency of data being place into the device, which allows the FIFO to convert the frequency of signals. However, logic controlling the FIFOs must avoid instructing the output to advance to the next entry when there is no data in the device, and avoid instructing the input to place data in the next entry when the device is full of data.

Figure 3A:
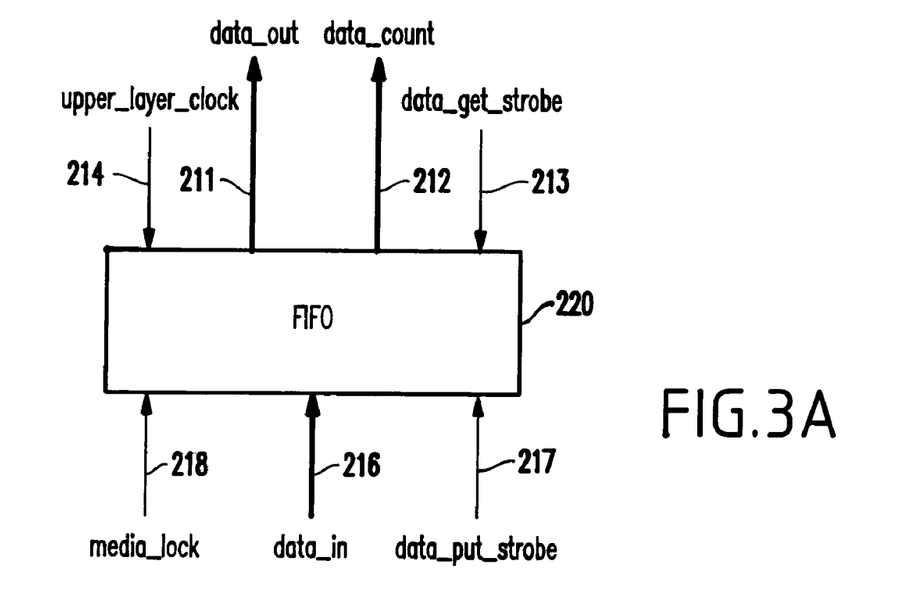
FIG. 3a shows an elastic FIFO used in the invention.

FIG. 3a shows the detailed operation of the elastic FIFO device used in the invention. The elastic FIFO buffers for the receive (RX) and transmit (TX) components 220, 230 have multiple memory locations. Data is output in the same consecutive order as entered. There are controls on the input to the FIFO that instruct the device to latch the current input and place it into the next memory location, and controls on the output that instruct the device to present the next memory location on the output. There are also indications from the devices 220, 230 on how much data is currently in the device. The elastic FIFOs 220, 230 for each lane have a data byte signal 211, a FIFO data count indication 212, a data strobe signal 213 and an upper layer clock signal 214. Additionally, a data byte in signal 216, data_put strobe signal 217 and a media clock signal 218 are used for data transmission control, as explained below.

The upper layer clock signal 214 provides a clock from the upper link layer logic 250. This is the step down speed that can operate at a slower speed compared to the media side 280 (e.g., using the multiplexors 215, 236 for the data lane changes by the FIFOs 220, 230). The Data out signal 211 provides a data byte transmitted into the elastic FIFO from below. This is advanced to the next entry in the FIFO when the data_get strobe signal 213 is asserted on an upper layer clock edge. The data_count signal 212 measures the amount of data in FIFO at any given time. This value is increased when data is placed in FIFO from the media side (e.g., multiplexors 215, 236), and decremented when data is removed to the upper layer 250. The data_get strobe signal 213 provides an indication that upper layer logic has fetched the data on data_out 211, and that the FIFO should move to the next entry. The media clock signal 218 is a clock signal operating at the media speed. The data_in signal 216 is a data byte from the media (link) to be placed in FIFO. The data_put signal 217 provides an indication that FIFO should place data on data_in 216 as a signal into FIFO.

The FIFO 220 (230) uses each latching edge of media_clock signal 218 for which data_put_strobe signal 217 is asserted to free an entry in the FIFO, and place the data in the entry on the output of the FIFO. The FIFO uses each latching edge of data_out_clock signal 214 for which the data_byte_get_strobe signal 213 is asserted to place an entry into the FIFO.

The FIFO presents how much data is currently in the FIFO on the data_count 212. This value is updated as data is inserted and removed. The upper layer logic section 250 uses the data_count output 212 to monitor the status of the FIFO. If all of the entries in the FIFO are used, the upper layer logic will deassert data_byte_get_strobe signal 213 until the data_count value indicates that there is an entry available. When the above operation is used, the upper layer logic section 250 can operate at lower frequencies, and clock domain conversion is achieved.

Figure 3B:
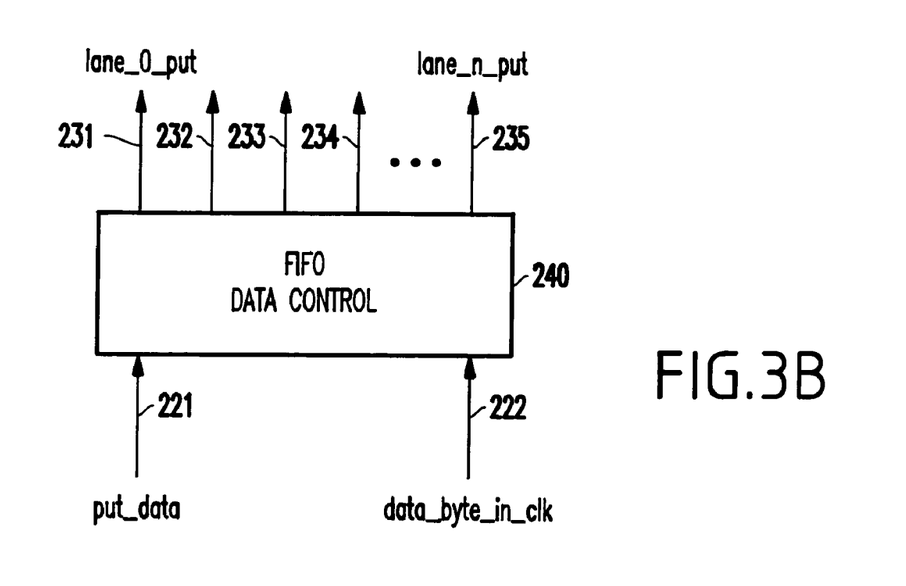
FIG. 3b shows a FIFO data control section used in the invention.

As shown in FIG. 3b, the media side put_data signal 221 is an input-signal indication from the low level logic section 205 that a byte is ready to be transmitted. The data_byte_in_clk signal 222 provides an input from the SERDES clock 225. The lanes 231-235 (up to n-channels wherein typical InfiniBand can handle 12 channels) have put signals: lane_0_put signal 231 an output-data put for lane 0; lane_1_put signal 232, an output-data put for lane 1; lane_2_put signal 233 an output-data put for lane 2; lane_3_put signal 234, an output-data put for lane 3; . . . and lane_n_put signal 235, an output-data put for lane n. On any specific cycle, the logic passes the put_data input through to only one output. On each cycle where the put_data is asserted, cycles to the next output, in order (0,1,2,3 . . . ). The FIFO's 220, 230 and FIFO data control 240 as shown in FIGS. 3a and 3b enable the lane width changes for the speed transformation between a slower upper link layer 250 and the faster transmission media 280.

Therefore, by monitoring the media lane clock 218, the FIFO data control 240 controls the multiplexors 215, 236 to selectively engage or disengage the transmission lanes 225, 227 so as to perform an appropriate speed reduction to allow the transmission media 280 to properly communicate with the ASIC 246.

Figure 4A:
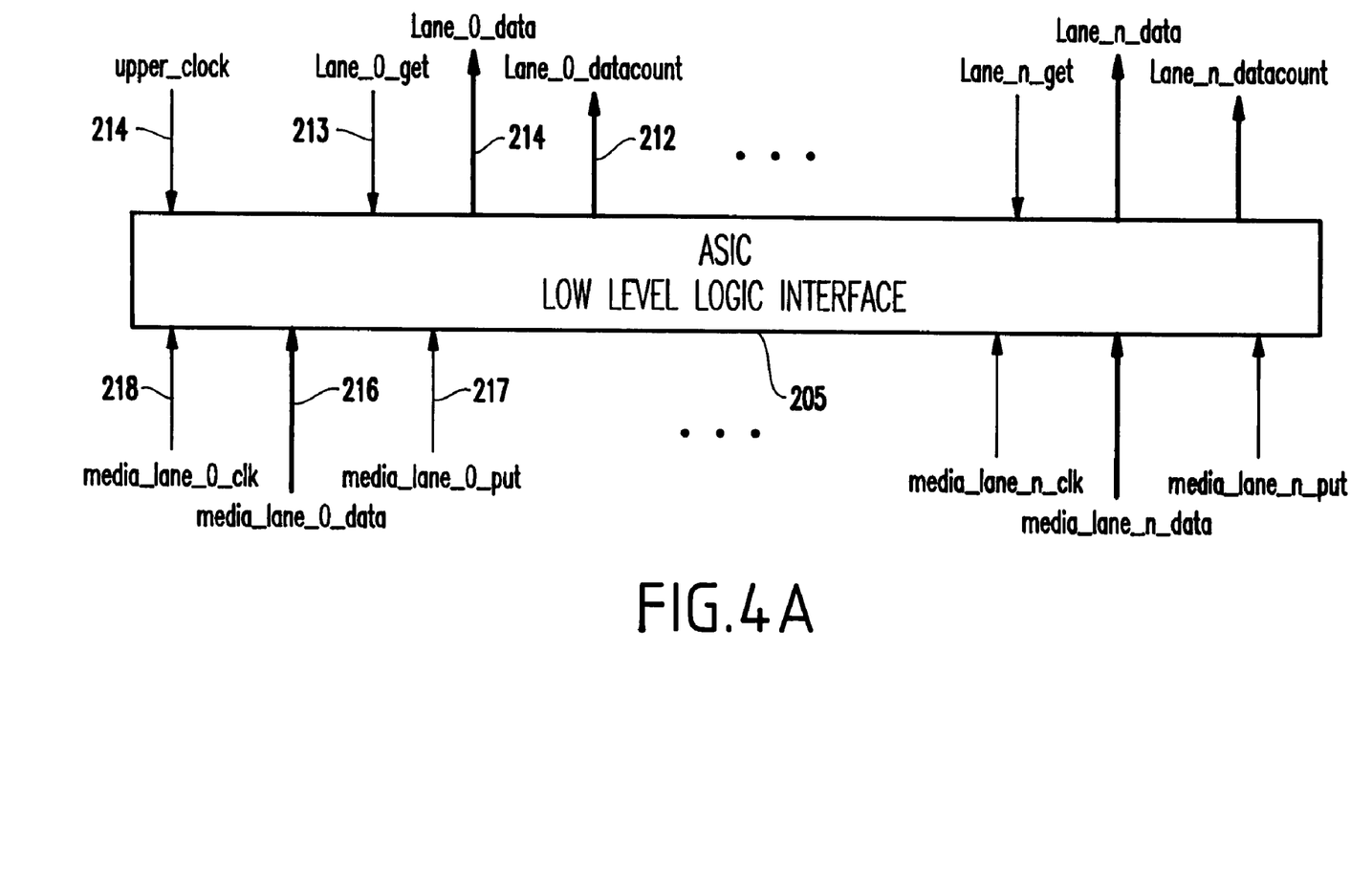
FIG. 4a shows a block diagram of a low level logic interface.
Figure 4B:
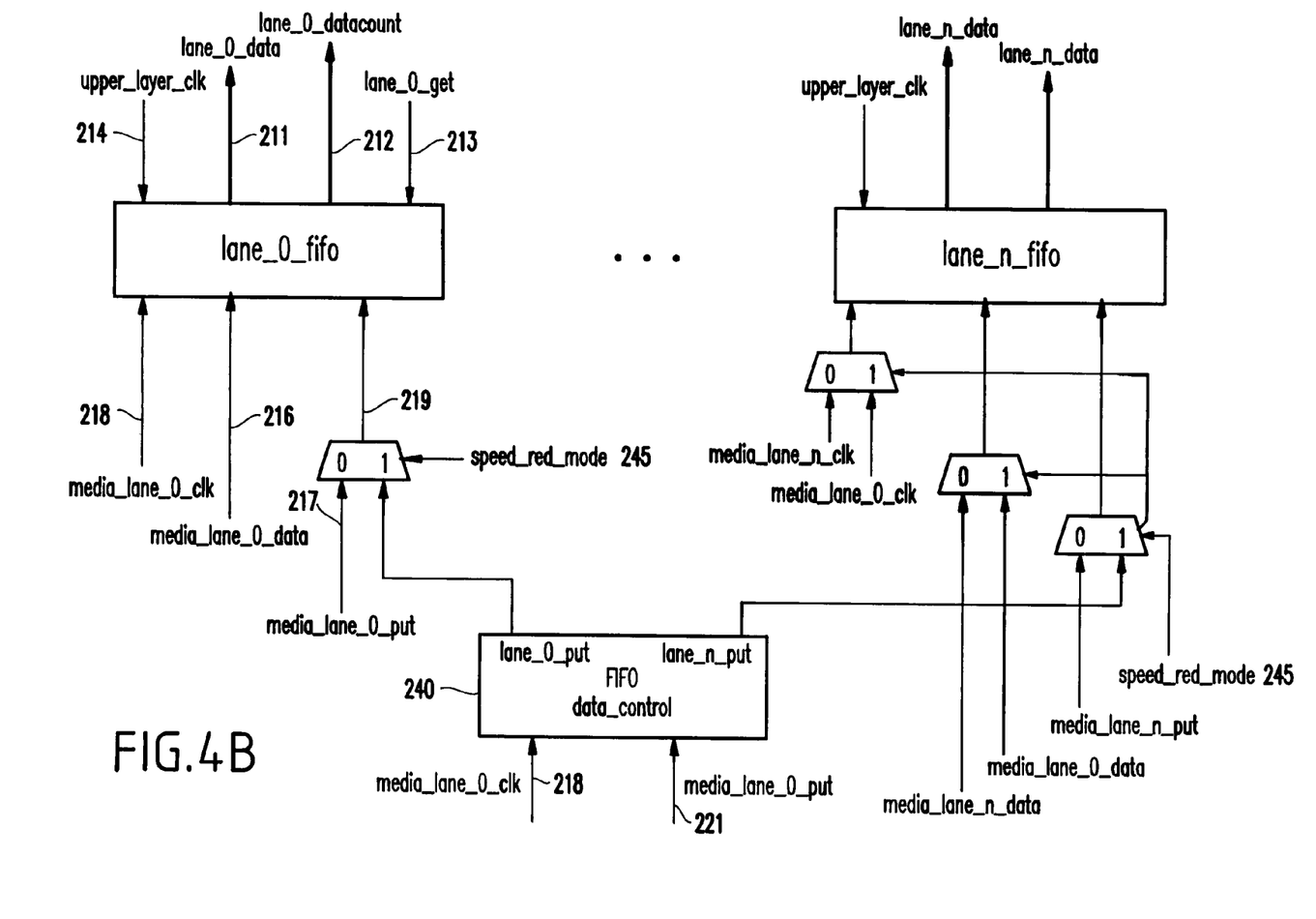

FIGS. 4a and 4b show the signals flowing in and out of the low level logic 205 and the operation of the data FIFO control 240 with respect to different data lanes. The discussion below pertains to data lane_0 that is replicated for as many data lanes as necessary up to n as shown (e.g, there can be up to 12 lanes when used in an InfiniBand network). As shown, the interface signals include a speed_red_mode input signal 245 (output by the FIFO data control 240 or some other similar logic unit) that determines if and how much of a speed reduction should be made using selectors 215, 236. The upper_clock signal 214 is input from the upper link layer 250. The data lane_0_get signal 213 is used to get a strobe for the upper layer lane 0 data byte. The lane_0_data signal 213 is an upper layer data byte signal. A lane_0_datacount signal 212 provides an upper layer measure of volume of lane_0_FIFO (one of the FIFOs 220, 230). Using this lower level logic interface 205 by placing data in the lane extensions by selective control of the FIFO 220, 230 allows the higher level logic 250 to operate at slower frequencies, while still allowing the same logic to be reused in wider lane modes of operation.

For a transmit data path, FIFO data control 240 (or a separate similar unit) can be used to control the removal of data from the transmit elastic FIFOs 230 as shown in FIGS. 4a and 4b. The FIFO data_control 240 controls the data_get signals to each of the transmit elastic FIFOs 230 in the same manner as the data_control 240 in the receive data path (if a separate unit is used). In addition, the data_control 240 selects the data bytes from each of the FIFOs 230 to pass to the lane_0 of transmit TX SERDES 225.

As mentioned above, new technologies in parallel-serial architecture create situations where the parallel-serial architecture transmission media is operating at a different speed than some of the devices connected thereto. In order to accommodate this situation, the invention includes multiplexors 215, 236, connected to elastic FIFOs 220, 230. The multiplexors 215, 236 selectively engage a different number of data lanes 225 (change lane width) in order to perform a speed reduction between the transmission media 280 and the ASIC 246.

Therefore, the invention increases the applicability of parallel-serial architecture transmission media to different speed processing devices by providing different data lane widths to adjust the data speed. As would be known by one ordinarily skilled in the art given this disclosure, the invention is applicable to parallel-serial architecture transmission media that have speeds lower and higher than processors connected to the transmission media. Further, while specific speed reductions are discussed above (e.g., 1×, 4×, etc.), as would be known by one ordinarily skilled in the art given this disclosure, the invention is applicable to any factor of speed adjustment needed, depending upon the specific parallel-serial architecture design involved.

While the invention has been described in terms of preferred embodiments, those skilled in the art will recognize that the invention can be practiced with modification within the spirit and scope of the appended claims.

What is claimed is:

1. A core for providing communications between a transmission media and a processor in a parallel serial architecture, said core comprising:
   serial data lanes connecting said processor to said transmission media; and
   at least one selector connected to said serial data lanes,
   wherein said transmission media and said processor have different operating speeds, and
   whereby said selector selectively engages different numbers of said serial data lanes to alter a speed of data passing through said core such that said selector is adapted to perform a speed reduction to accommodate said different operating speeds of said transmission media and said processor,
   wherein each of said serial data lanes includes a buffer that corrects for frequency deviations in said transmission media and modifies the frequency of signals in said serial data lanes.

2. The core in claim 1, further comprising a data controller for controlling an operation of said selector.

3. The core in claim 1, wherein said buffer comprise elastic first in, first out (FIFO) buffer.

4. The core in claim 1, wherein said selector comprises a multiplexer.

5. The core in claim 1, wherein additional speed adjustment is attained by said selector engaging additional lanes.

6. A parallel-serial communication system comprising:
   at least one processor;
   at least one transmission media connecting said at least one processor, wherein said transmission media and said processor have different operating speeds; and a core between each processor and said transmission media, said core providing communications between said transmission media and said processor, and said core comprising:

serial data lanes connecting said processor to said transmission media; and at least one selector connected to said serial data lanes, whereby said selector selectively engages different numbers of said serial data lanes to alter a speed of data passing through said core such that said selector is adapted to perform a speed reduction to accommodate said different operating speeds of said transmission media and said processor, wherein each of said serial data lanes includes a buffer that corrects for frequency deviations in said transmission media and modifies the frequency of signals in said serial data lanes.

7. The parallel-serial communication system in claim 6, further comprising a data controller for controlling an operation of said selector.

8. The parallel-serial communication system in claim 6, wherein said buffer comprise elastic first in, first out (FIFO) buffer.

9. The parallel-serial communication system in claim 6, wherein said selector comprises a multiplexer.

10. The parallel-serial communication system in claim 6, wherein additional speed adjustment is attained by said selector engaging additional lanes.

11. A core for providing communications between a transmission media and a processor in a byte stripped parallel serial InfiniBand architecture, said core comprising:

serial data lanes connecting said processor to said transmission media; and at least one selector engages different numbers of said serial data lanes to alter a speed of data passing through said core such that said selector is adapted to perform a speed reduction to accommodate said different operating speeds of said transmission media and said processor, wherein each of said serial data lanes includes a buffer that corrects for frequency deviations in said transmission media and modifies the frequency of signals in said serial data lanes.

12. The core in claim 11, further comprising a data controller for controlling an operation of said selector.

13. The core in claim 11, wherein said buffer comprise elastic first in, first out (FIFO) buffer.

14. The core in claim 11, wherein said selector comprises a multiplexer.

15. The core in claim 11, wherein additional speed adjustment is attained by said selector engaging additional lanes.

* * * * *